United States Patent
Brownell et al.

(10) Patent No.: US 6,336,147 B1
(45) Date of Patent: *Jan. 1, 2002

(54) METHOD AND APPARATUS FOR MANAGING CONNECTIONS FOR COMMUNICATION AMONG OBJECTS IN A DISTRIBUTED OBJECT SYSTEM

(75) Inventors: David M. Brownell, Palo Alto; Pavani Diwanji, Stanford; Neguine Navab; Peter Vanderbilt, both of Mountain View, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/967,874

(22) Filed: Nov. 12, 1997

Related U.S. Application Data

(63) Continuation of application No. 08/408,316, filed on Mar. 22, 1995, now abandoned.

(51) Int. Cl.[7] .................................................. G06F 9/00
(52) U.S. Cl. ....................................................... 709/310
(58) Field of Search ................................. 395/675, 670, 395/200.56, 200.33, 200.31, 200.67; 709/105, 100, 256, 233, 231, 267, 310, 219, 217, 203

(56) References Cited

U.S. PATENT DOCUMENTS

| | | | | |
|---|---|---|---|---|
| 4,716,528 A | * | 12/1987 | Crus et al. ................... 364/300 |
| 5,155,851 A | * | 10/1992 | Krishnan ..................... 395/650 |
| 5,249,290 A | * | 9/1993 | Heizer ......................... 395/650 |
| 5,301,280 A | * | 4/1994 | Schwartz et al. ........... 395/325 |
| 5,329,619 A | * | 7/1994 | Page et al. ................... 395/200 |
| 5,396,630 A | * | 3/1995 | Banda et al. ................ 395/700 |
| 5,421,015 A | * | 5/1995 | Khoyi et al. ................. 395/650 |
| 5,448,727 A | * | 9/1995 | Annevelink ................. 395/600 |
| 5,452,459 A | * | 9/1995 | Drury et al. ................. 395/700 |
| 5,475,817 A | * | 12/1995 | Waldo et al. ................ 395/650 |
| 5,546,584 A | * | 8/1996 | Lundin et al. ............... 395/700 |
| 5,553,239 A | * | 9/1996 | Heath et al. ............ 395/187.01 |
| 5,687,167 A | * | 11/1997 | Bertin et al. ................. 370/254 |
| 5,713,027 A | * | 1/1998 | Soejima et al. ............. 395/750 |
| 5,734,810 A | * | 3/1998 | Tanaka et al. .......... 395/182.02 |
| 5,790,804 A | * | 8/1998 | Osborne ................. 395/200.75 |
| 5,805,804 A | * | 9/1998 | Laursen et al. ......... 395/200.02 |
| 5,907,675 A | * | 5/1999 | Aahlad ................... 395/200.33 |

OTHER PUBLICATIONS

Sybase SQL Server, Ref. Manual: vol. II, System Procedures and Catalog Stored Procedures, pp. 1–215 to 1–217, 1993.*

* cited by examiner

*Primary Examiner*—Majid Banankhah
*Assistant Examiner*—Sue Lao
(74) *Attorney, Agent, or Firm*—Beyer Weaver & Thomas, LLP

(57) ABSTRACT

A method and apparatus for managing connections between objects in a distributed object system includes a method and apparatus for terminating connections between objects. In one aspect, the method for terminating a connection, a connection end message is sent from a server to a client indicating to the client that the server will no longer accept requests before the connection is terminated. Preferably a connection end code is included with the connection end message. In another aspect, the invention includes a method for making connections between objects are formed by intelligently closing existing connections that meet the criteria of being established and across which no unfulfilled requests or unforwarded replies are pending. If several connections meet these criteria, the oldest unused connection is terminated. The methods and apparatus described provide for the creation and termination of connections efficiently and robustly by allowing the controlled shut down of connections between clients and servers without invoking an error state.

20 Claims, 11 Drawing Sheets

METHOD AND APPARATUS FOR MANAGING CONNECTIONS FOR COMMUNICATION AMONG OBJECTS IN A DISTRIBUTED OBJECT SYSTEM

This is a continuation, of application Ser. No. 08/408,316 filed Mar. 22, 1995 abandoned.

BACKGROUND OF THE INVENTION

1. The Field of the Invention

The present invention relates to the fields of distributed computing systems, client-server computing and object-oriented programming. More specifically, the present invention includes a method and apparatus for managing connections among process that implement objects in a distributed object environment.

2. The Relevant Art

Object oriented programming methodologies have received increasing attention over the past several years in response to the increasing tendency for software developed using traditional programming methods to be delivered late and over budget (Taylor 1990; Gibbs 1994). This problem stems from the fact that software written using traditional programming techniques that emphasize procedural models and "linear" code is extremely difficult to design and maintain for many problems. Generally, large programs created using traditional methods are "brittle", that is, even small changes can effect all elements of the programming code. Thus, minor changes made to the software in response to user demands can require major redesign and rewriting of the entire program.

Object oriented programming strategies tend to avoid these problems because object methodologies focus on manipulating data rather than procedures; thus, providing the programmer with a more intuitive approach to modeling real world problems. In addition objects encapsulate related data and procedures so as to hide that information from the remainder of the program by allowing access to the data and procedures only through the object's interface. Hence changes to the data and/or procedures of the object are relatively isolated from the remainder of the program. This provides code that is more easily maintained as compared to code written using traditional methods, as changes to an object's code do not affect the code in the other objects. In addition, the inherent modular nature of objects allows individual objects to be reused in different programs. Thus, programmers can develop libraries of "tried and true" objects that can be used over and over again in different applications. This increases software reliability while decreasing development time, as reliable programming code may be used repeatedly.

However, the full promise of object oriented methodologies, especially the advantages afforded by their modularity, have yet to be achieved. In particular, it would be highly desirable to allow programmers and other users access to objects in a transparent fashion so that objects created in different programming languages and objects residing on different computing platforms that are networked together are accessible to the user without extensive modification of the user's programming code.

Attempts to provide such facilities have been made using object oriented distributed systems that are based upon a client-server model, in which object-servers, or objects, provide interfaces to clients that make requests to the objects. Typically, in such systems the objects consist of data and associated methods and are contained within a server process. Clients obtain access to the functionalities of objects by executing calls on them, which calls are mediated by the distributed system. When the object within the server process receives a call it executes the appropriate method and transmits the result back to the client. The client and server process communicate through an Object Request Broker (ORB) which is used to locate the various distributed objects and establish communications therebetween (OMG 1990).

The object paradigm in distributed systems is a useful technique as it separates the object's interface from its implementation; thus, allowing software designers to take advantage of the functionalities of various objects available to them without having to worry about the details of the object's implementation. The programmer need only be aware of the object's interface. In addition, object oriented distributed systems allow for multiple implementations of a single interface, which interface may reside on different computing platforms that have been connected through a network. Thus, a programmer working on one machine of a network may make a call to an object about which the programmer has no detailed knowledge with the confidence that at the appropriate time the remote object will be accessed and return its data so that the programmer's code will function properly. Such a system thus maximizes the inherent advantages of object oriented methodologies by taking full advantage of their modularity and encapsulation.

Unfortunately, the methods governing connections between clients and servers in present distributed object environments suffer from several serious drawbacks. Generally, present distributed object systems define clients and servers as unequal partners for the purposes of controlling connections by using what is known as an "asymmetric" protocol (Levy 1991). In an asymmetric protocol, only the client can break a connection in a client-server communication (the "smart client, dumb server" model). Yet often it is the server that needs to limit the number of connections made to it so as to avoid becoming overloaded with client requests. Nevertheless, in asymmetric systems the server must wait until a client breaks a connection before resources can be freed in the server.

In addition, present systems require clients to maintain an exclusive connection for the duration of the call to the server. This requirement forces other clients to either (1) wait for free connections with the server, thus degrading the operation of the system as bottlenecks develop while clients wait for replies from the connected servers; or (2) establish new connections to the same server. Thus, a client must wait while the server completes execution of a remote operation even though other clients could take advantage of the temporarily idle connection. Both conditions prevent efficient multiplexing of connections and therefore degrade system performance and waste system resources, such as memory and processor cycles. -Present systems also manage resources inefficiently by requiring separate connections for client-to-server and server-to-client invocations. Thus, two client-server transactions can tie-up two communications channels where the use of a single channel for both transactions may suffice. Furthermore, present distributed object systems are not designed to handle multithreaded processing and therefore fail to take advantage of the opportunities of multithreaded technologies.

Finally, in present systems termination of connections before the completion of a transaction between the server and client (i.e., a request followed by a reply) generate an error state regardless of whether the termination was performed by the system or is the result of a true system error.

Thus, even routine cases where a connection is shut down in a controlled manner are treated as an error condition, as if the other end of the connection failed. Such a method leaves the status of the transaction between the client and server completely ambiguous and promotes inefficiency, or worse causes a programming or system failure as the abandoned side of the connection either has to resend a request that has already been fulfilled or assume the request has been met when in fact the request has gone ignored.

SUMMARY OF THE INVENTION

The present invention includes a method and apparatus for forming and terminating connections between objects in a distributed object environment. Using the method and apparatus of the invention, connections between objects can be created and terminated in a reliable and efficient manner. In one especially important aspect, the present invention provides a method for deliberately terminating connections without loss of information. This method allows an object to determine how to re-establish its connection to the object it had been communicating with. This feature increases system reliability and robustness by reducing the chance of system failure arising from the use of false error messages.

In one aspect, the present invention includes a method for terminating connections between a server process and a client which includes the steps of sending reliably a connection end message from the server process to the client across the connection. The connection end message is effective to indicate to the client that the server process will no longer respond to request messages sent by the client to the server. The method further includes the step of closing the connection. In a preferred embodiment, the connection is a multiplexed connection between the server and client which allows the server and client to pass messages between each other using the same physical connection. In another preferred embodiment, a shut down code is sent along with the connection end message. The shut down code is effective to indicate to the client how to reconnect to a server process that includes the object which the client is invoking. Preferably the connection is terminated in response to a determination that the server is in an overloaded or oversubscribed state.

In another aspect, the present invention includes a method for establishing a connection between a client and an object in a multithreaded environment. The method of the invention includes searching for an active connection record in a table of active connection records, and examining the host name and the server port ID of a least one active connection record in the table of active connection records. If an active connection record is found having the desired host name and server port ID, a determination is made as to whether the active connection is in an established state and whether the write lock of the active connection record is held. The method concludes with the step of acquiring the active connection record. In a preferred embodiment, the method just described further includes the step of acquiring a table lock on the table of active connection records and releasing a table lock after the active connection has been acquired, and the step of waiting for the active connection to reach an established state and the write lock to be released.

In another preferred embodiment, the above described method for establishing a connection further includes searching for a free connection record in response to a determination that no active connection record is available for connecting to the server. If a free connection record is available, the free connection record is initialized and moved to the list of active connection records to create thereby a new active connection, which is marked as opening. The write lock of the new active connection and the communication endpoint are acquired after which a connection between the client and server is established. Upon establishing the connection, the active connection record is marked as established. In a preferred embodiment, the method further includes the step of signaling waiting threads that a new connection is now established, and releasing temporarily the table lock on the table of active connection records during the period in which the connection is being established.

In still another aspect, the present invention includes a method for creating a connection between a client and a server process by closing an existing active connection between a client and an object. The method of the invention includes determining whether an existing active connection between the object and client is an established state and, if so, whether any requests that have been issued on the connection have not been responded to, or if any requests already received on the connection have not been responded to. In a preferred embodiment, if more than one active connection meets these criteria, the oldest unused active connection is closed.

In a separate aspect of the present invention, a computer process for use on a computer system a distributed object system is disclosed. The computer process has an active connection table which includes a table lock operable to inhibit access to the active connection table such that only a single entity having possession of the table lock may access the active connection table and a connection record for use in storing information regarding a connection between the computer process and a host computer system. In a related aspect of the present invention the connection record includes a host name field, a port identification field, a connection handle field, a connection state, a connection write lock, a requests outstanding field, and a replies outstanding field. The host name field is for use in identifying the host computer with which the computer process has the connection. The port identification is for use in specifying a port number for the host computer. The connection handle field contains a value which uniquely identifies the connection. The connection state indicates the state of the connection and may be either free, opening, established, or closing. The connection write lock indicates whether the connection is available for writing and the connection read lock indicates whether the connection is available for reading. The requests outstanding field serves to indicate the number of requests made by a client across the connection which have not been responded to. The replies outstanding field serves to indicate the number of replies a server has not yet provided across the connection. Both the server and the client are associated with the computer process.

In yet another aspect the present invention includes a distributed object system which system includes a system for terminating the connection between a server process and a client. The system includes a messaging device for sending a connection end message from the server process to the client, which connection end message is effective to indicate to the client that the server process will no longer respond to request messages sent from the client. The system further includes a mechanism for closing the connection. Preferably the connection is a multiplexed connection and includes a mechanism for maintaining more than one connection between the server process and other client objects. Preferably the connection is terminated in response to a determination that the server is in an overloaded or oversubscribed state.

In still another aspect the present invention includes an apparatus for establishing a connection between a client and the server process in a multithreaded environment. The apparatus includes a first search mechanism for searching for an active connection record in a table of connection records and an examination device for examining the host name and server port ID of at least one active connection record in the table. The system further includes a first state evaluator for determining whether an active connection record having an appropriate host name and server port ID is in an established state and that the write lock state of the active connection record is not held by an active thread.

The system in another preferred embodiment further includes a second search mechanism for searching for a free connection record if no active connection record is available and an initializer for initializing a free connection record and moving the connection record to the active connection record list to thereby create a new active connection if a free connection record is available. The system further includes a first marking device for marking the new active connection as opening and an acquisition device for acquiring the write lock of the active connection. The system also includes a communications device for acquiring a communication end point and establishing a connection between the client and server in addition to a second marking device for marking the active connection record as established.

In still another aspect the system includes a closing device for closing an active connection including a first evaluator for determining if an active connection is in an established state, and second and third evaluators for determining if an established connection is idle, i.e., that any request that has been issued on the active connection has not received a response and any request has been received on the active connection that has not been responded to.

Preferably the system further includes another messaging device for sending a connection end message from the server process to the client on the connection, the connection end message being effective to indicate to the client that the server process will no longer respond to request messages from the client and means for closing the connection.

These and other aspects and advantages of the present invention will be made more clear by reference to the detailed description below and the accompanying figures.

DESCRIPTION OF SPECIFIC EMBODIMENTS

I. DEFINITION OF TERMS

Figure 1:
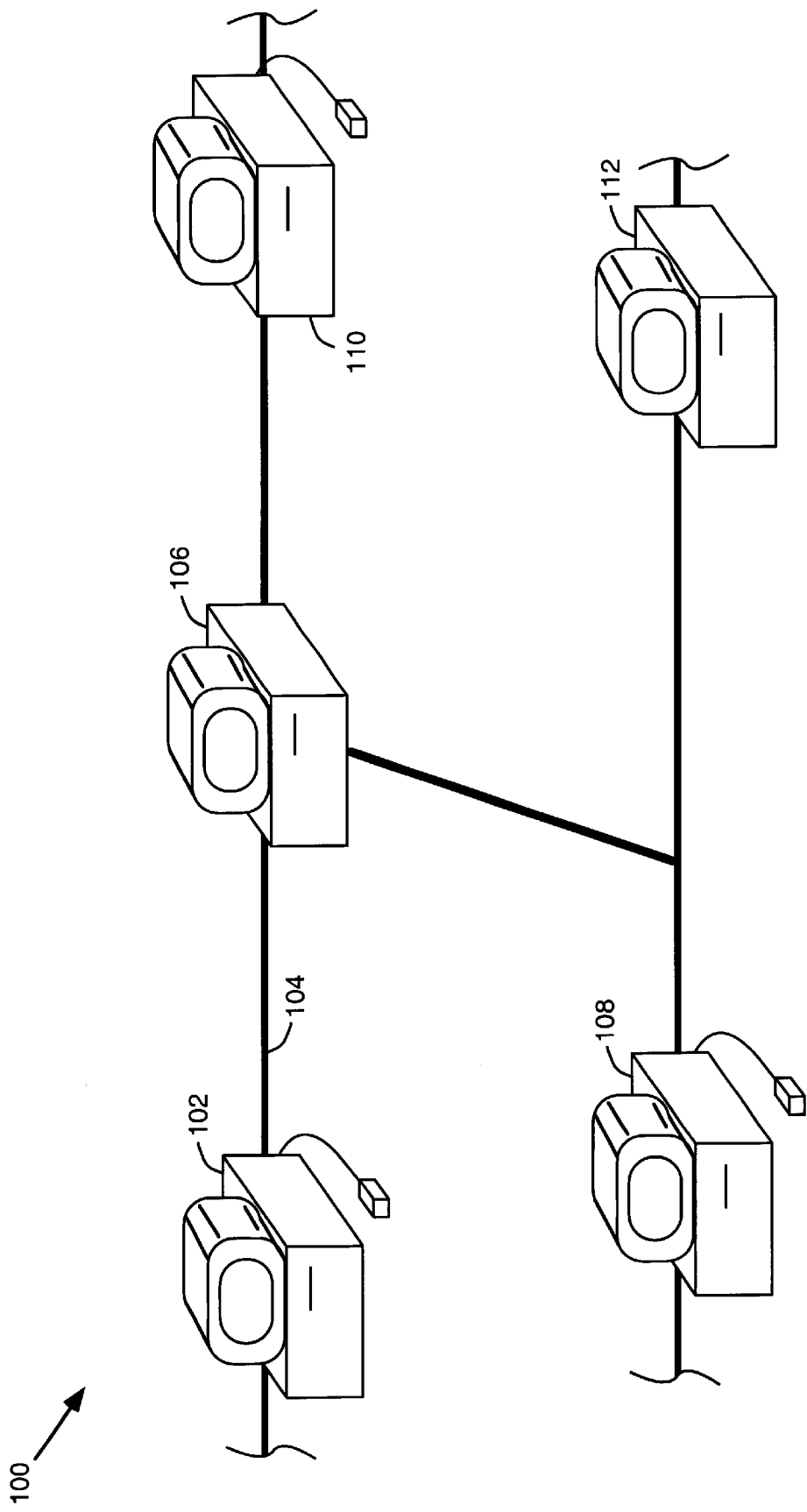
FIG. 1 is a schematic illustration of a distributed object system in accordance with the present invention.

As used herein, the term "distributed object" or "object" refers to an encapsulated package of code and data that can be manipulated by operations defined by the interface to the distributed object. Thus, distributed objects will be seen by those of skill in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is OMG-IDL (OMG 1993). Second, distributed objects are location-independent, i.e., distributed objects can be located anywhere in a network. This contrasts sharply with traditional programming objects which typically exist in a single address space: the address space of the client. Distributed objects can be both object-clients and objectservers, depending upon whether they are sending requests to other objects or replying to requests from other objects. Requests and replies are made through an object request broker (ORB) that is aware of the locations and status of the objects.

A "distributed object system" or "distributed object environment" refers to a system comprising remote objects that communicate through an object request broker (ORB). The ORB is aware of the locations and statuses of the object in the distributed object system. A preferred system architecture for implementing such an ORB is provided by the Common Object Request Broker Architecture (CORBA) specification. The CORBA specification is defined by the Object Management Group (OMG), a consortium of vendors including Sun Microsystems, Incorporated, Digital Electronics Corporation, Hyperdesk Corporation, Hewlett-Packard Corporation, SunSoft, NCR Corporation and Object Design, Incorporated. Under the CORBA, a distributed object system is defined in terms of a client-server model wherein target objects, or servers, provides services to clients that request such services.

An "object reference" or "object" is an object that contains a pointer to another object. The creation and definition of object references will be familiar with those skilled in the art (OMG 1993). Generally an object reference is a data structure that holds information that identifies an object. Such information can include, e.g., a pointer to a data structure that is the object or a network address of an object.

A "client" as defined herein refers to an entity that sends a request to another object, also called a "target object", which target object resides in a process referred to herein as a "server". Target objects may also be referred to as servers. As used herein, the term "entity" refers to an object, data structure or event that initiates an action in the system (e.g., a mouse click, keyboard stroke or an interrupt received from mass storage or a network connection). Thus, clients invoke operations, or implementations, from servers. In a distributed object environment, clients need not have knowledge of the implementation's (or object's) programming language, nor does the implementation have to have knowledge of the client's programming language due to the multilingual character of distributed objects. Clients and servers in distributed object environments need only communicate through their interfaces. As noted above, requests by the client to servers, and the servers' replies to the client, are handled by the ORB.

An "object interface," is a specification of the operations, attributes, and exceptions that an object provides. Preferably, object interfaces for distributed objects are written using OMG-IDL. As noted above, objects perform transactions through their interfaces. The use of interfaces therefore relieves the need of objects to be aware of the programming languages used to define the methods and data of the other objects in the transaction.

II. MANAGING CONNECTIONS AMONG DISTRIBUTED OBJECTS

In a distributed object environment, requests and replies are made through an Object Request Broker (ORB) that is aware of the locations and status of the object. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where distributed target objects are capable of providing services to clients requesting the service.

In a preferred embodiment of the present invention, distributed objects are located on one or more computers linked together by network such as the network illustrated at 100 in FIG. 1. As seen in the Figure, network 100 includes computer 102 which computer is coupled to a network 104. Network 104 further includes a server, router or the like 106 in addition to other computers 108, 110, and 112 such that data and instructions can be passed among the networked computers. The design, construction and implementation of computer networks will be familiar to those of skill in the art.

Figure 2:
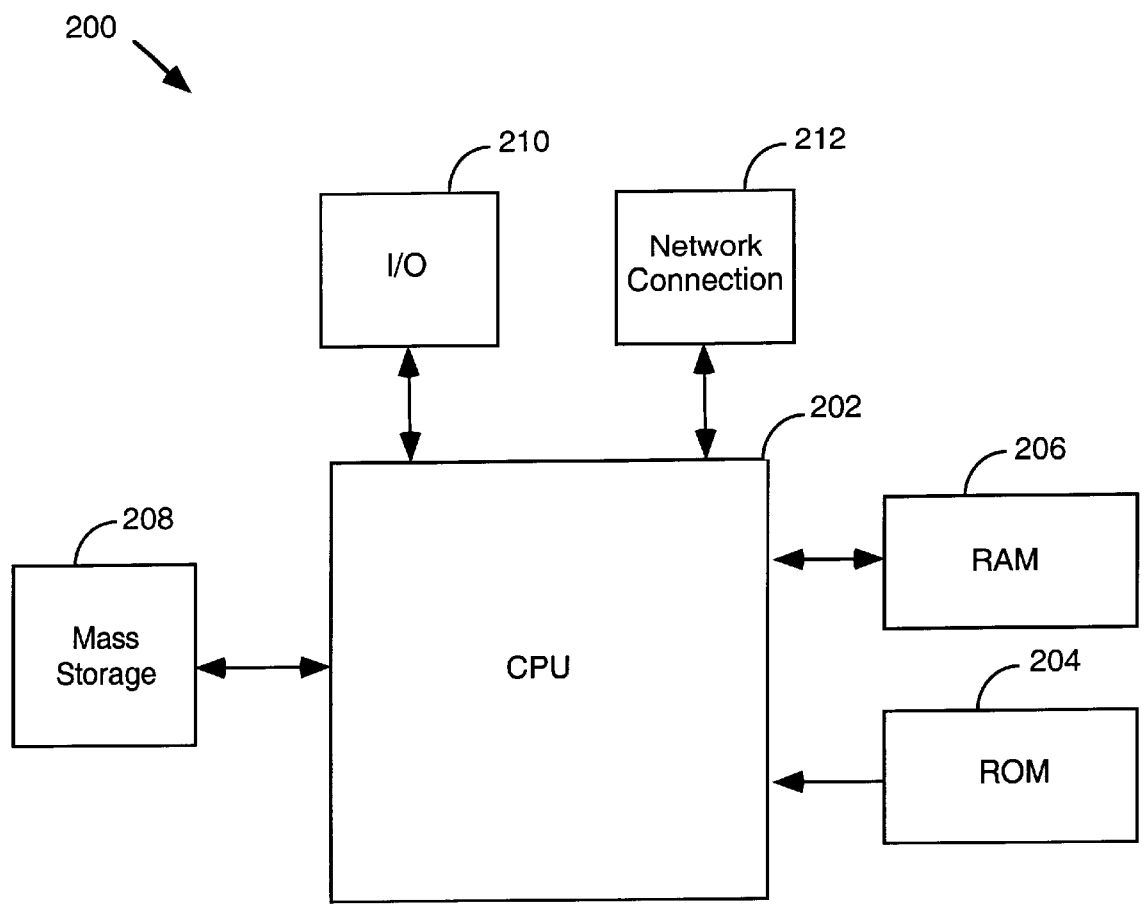
FIG. 2 is a schematic illustration of a computer system for a computer on the network described in FIG. 1.

Computers 102, 106, 108, 110, and 112 are illustrated schematically with respect to FIG. 2 at 200. Each computer includes a central processing unit (CPU) 202 which CPU is coupled bidirectionally with random access memory (RAM) 206 and unidirectionally with read only memory (ROM) 204. Typically, RAM 206 includes programming instructions and data, including distributed objects and their associated data and instructions, for processes currently operating on CPU 202. ROM 204 typically includes basic operating instructions, data and objects used by the computer to perform its functions. In addition, a mass storage device 208, such as a hard disk, CD ROM, magneto-optical (floptical) drive, tape drive or the like, is coupled bidirectionally with CPU 202. Mass storage device 208 generally includes additional programming instructions, data and objects that typically are not in active use by the CPU, although the address space may be accessed by the CPU, e.g., for virtual memory or the like. Each of the above described computers further includes an input/output source 210 that typically includes input means such as a keyboard, pointer devices (e.g., a mouse or stylus) or the like. Also, a network connection 212 can be included where the CPU is in communication with a computer network, such as network 104 of FIG. 1. Additional mass storage devices (not shown) may also be connected to CPU 202 through the network connection. The above described hardware and software elements, as well as the above described networking devices, are of standard design and construction, and will be well familiar to those of skilled in the art.

Residing on each of the computers across the network are a variety of processes and objects, which processes and objects can be in communication with each other, either within the memory space of the same machine or within the memory spaces of two or more machines residing on the network. As noted above, an object resides in a server process and functions to respond to a request made by a client. In distributed object systems, the communication of the request between the client and the object is mediated by an object request broker (ORB).

Figure 3:
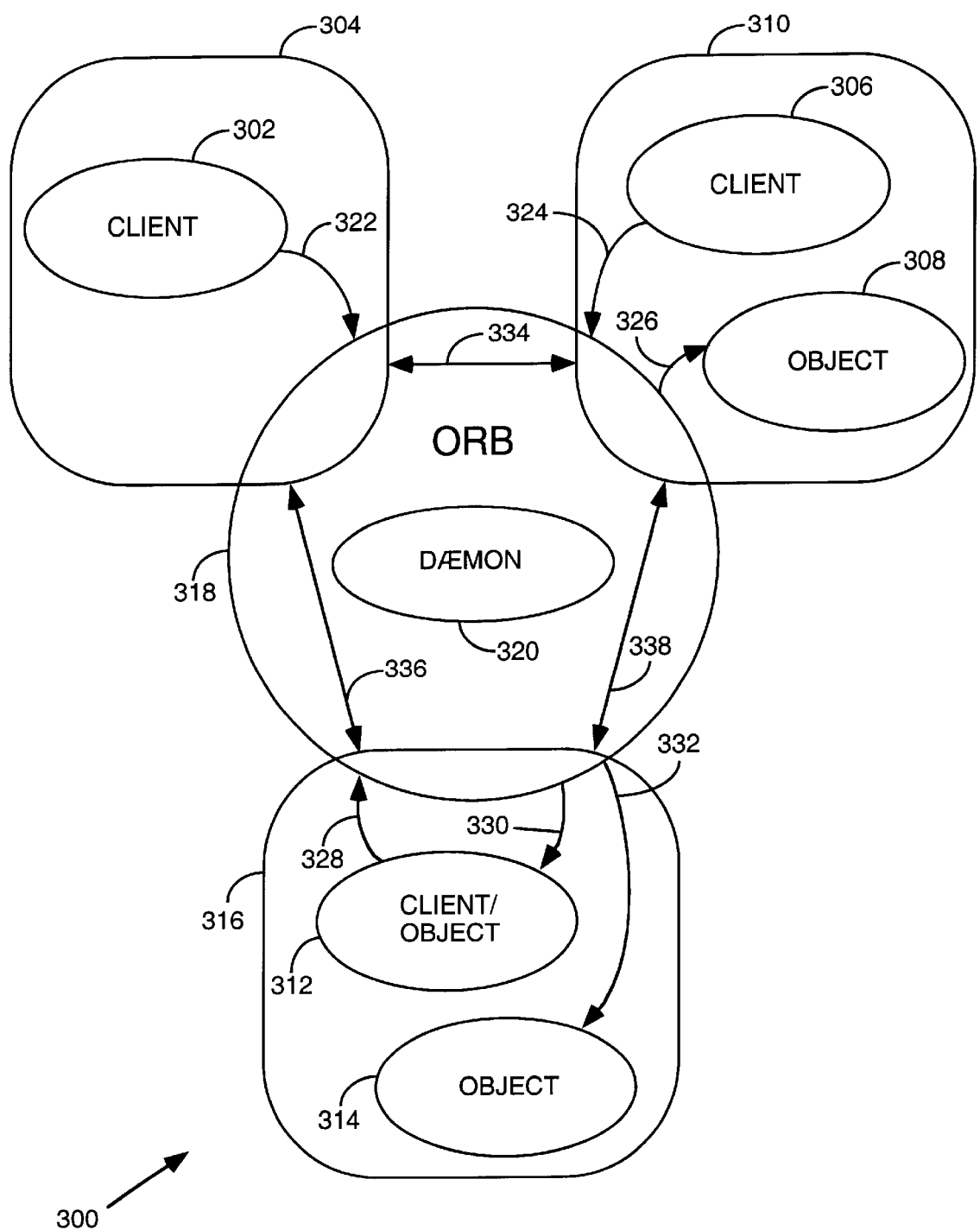
FIG. 3 is a schematic illustration of a client in communication with a server/client, which server/client is in communication with a server.

An example of such client/server relationships in a distributed object system is illustrated in FIG. 3 at 300, where a first client 302 resides in a process 304, a second client 306 and an object 308 reside in a second process 310 and a client/object 312 and second object 314 reside in a third process 316. It will be appreciated that connections can be established between clients and objects in different processes, e.g., between process 304 and process 310, or between clients and objects in the same process (e.g., client 306 and object 308). Each process may reside on separate computer(s) connected across a network, or two or more process may be located on the same machine. The use of objects and processes will be familiar to those of skill in the art.

Regardless of the physical location of the processes, each process communicates to another process through an object request broker (ORB) 318. ORB 318 typically includes at least one dœmon for processing connection requests from clients and servers such as Dœmon 320. Thus in terms of the definitions provided above, clients 302 and 304 request, or "invoke", replies from objects, such as objects 308 and 314, by first establishing connections 322 and 324 with the ORB respectively. The requests are processed by the ORB and the Dœmon which communicate with target objects 306 and 312 over connections 324 and 328 respectively. The ORB then establishes connections between the processes containing the appropriate clients and servers, such as connections 334 (connecting processes 304 and 310), 336 (connecting processes 304 and 316) and 338 (connecting processes 310 and 316). In a preferred embodiment, objects can act both as clients and servers, such as client/object 312 which communicates with ORB 318 over connections 328 and 330.

The use of a dœmon such as Dœmon 320 to establish communication between a client and an object is discussed in co-pending U.S. Patent Application Serial No. (Attorney Docket No. SUN1P030/P747), entitled "METHODS AND APPARATUS FOR MANAGING COMPUTER PROCESSES", by inventor Peter Vanderbilt, et al., filed concurrently herewith, and which is incorporated herein by reference. The formation of connections 322, 324, 328 and 330 is performed using the methods described below and in co-pending U.S. Patent Application Serial No. (Attorney Docket No. SUN1P025/P721), entitled "METHODS, APPARATUS, AND DATA STRUCTURES FOR MANAGING OBJECTS", by inventor David Brownell et. al. and filed concurrently herewith, which U.S. Patent Application is incorporated herein by reference.

In a preferred embodiment, the connections between clients, objects and the ORB as well as the connections between processes are multiplexed, i.e., data can be sent and received from the connected server and client substantially simultaneously across a single connection. In another preferred embodiment, objects or processes can communicate with more than one other object or process substantially simultaneously. Those of skill in the art will appreciate that such a combination stands in contrast to other remote procedure call (RPC) systems wherein requests and replies must be performed over separate connections and an object or process can communicate with only one other object or process at a given time.

Figure 4:
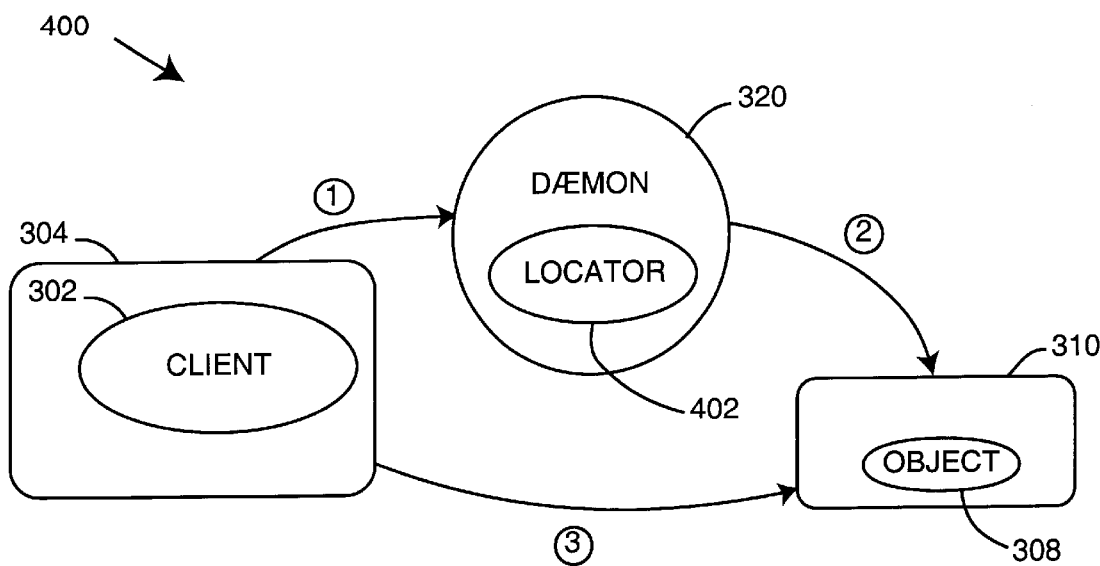
FIG. 4 is a schematic illustration of establishing a connection between a client an a server in accordance with the present invention.

A more detailed description of the formation of connections between processes, such as connections 334–338 is illustrated in FIG. 4 at 400. There, client 302 residing in process 304 seeks to invoke target object 308 in a server process 310 in response to a call generated from a method operating from within the client. To invoke the desired server, the client first passes a request, including an object reference, to Dœmon 320 which resides in the ORB (not shown) as illustrated along pathway 1 using the methods for establishing a connection as described below and in co-pending U.S. Patent Application Serial No. (Attorney Docket No. SUN1P025/P721), entitled "METHODS, APPARATUS, AND DATA STRUCTURES FOR MANAGING OBJECTS". In a preferred embodiment, the request is made via a stub coupled to the client, which stub is effective to translate the request generated internally to the client into a form that is used by the Dœmon to locate the appropriate server. Once the request has been passed through the stub to the Dœmon, the Dœmon refers to a Locator object 402 which Locator object matches the request from client 302 with a server that is appropriate to handle the client's request. In a preferred embodiment, the locator object is capable of launching an appropriate server process if no server process is presently running in the distributed operating system. Such a system is described in copending U.S. Patent Application Serial No. (Attorney Docket No. SUN1P030/P747), entitled "METHODS AND APPARATUS FOR MANAGING COMPUTER PROCESSES" by Peter Vanderbilt, et al. Once the appropriate server has been located or launched and a connection established between the Dœmon and the server (pathway 2), the location of the server is relayed back to client 302 so that client 302 may establish a connection directly to server 310, as illustrated by pathway 3 in the Figure.

Figure 5:
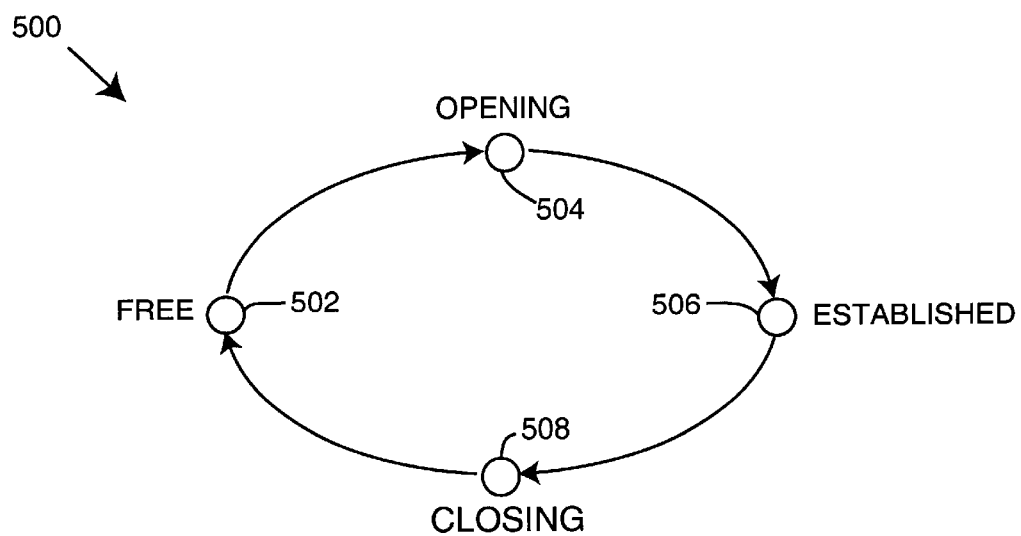
FIG. 5 is a state diagram illustrating the possible states of a connection.
Figure 6:
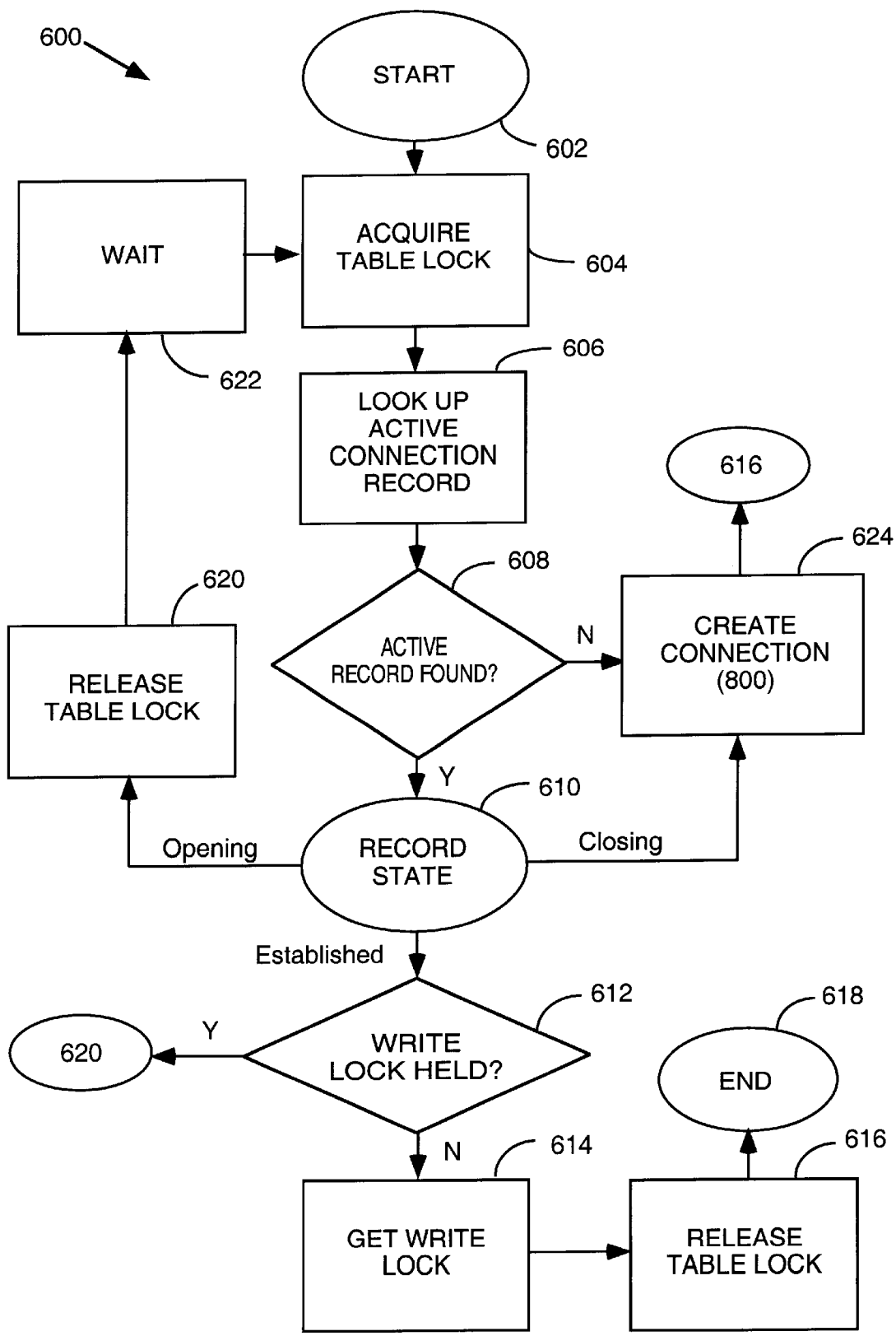
FIG. 6 is a schematic illustration of a method for creating a connection between a client and a server in accordance with the present invention.

Turning now to FIGS. 5 and 6, the formation of a connection between two objects, which connection is represented by a connection record as described below, will be discussed in greater detail. As will be familiar to those of skill in the art, connection records for connections between objects may exist in one of four states as illustrated in the state diagram shown at 500 in FIG. 5. A connection record initially exists in a free state 502, which free state indicates that the connection record is completely open for use between any two processes, i.e., the connection is unassigned and is completely inactive.

Once a connection record has been assigned to connect two processes and has been activated, but before the actual connection is established, the connection record is in the opening state 504. It will be appreciated that need to define an opening state for a connection record is due in part to account for the time lag common in distributed systems resulting from the need to establish communication between objects on machines located at remote points on a network. During this time, while the connection has not been completely established, i.e., data does not flow between the objects, the connection nevertheless should be made known, but unavailable, to other objects which seek that connection for their own uses to prevent excessive use of system resources. When the connection has been completed, the connection is said to be in an established state 506.

In the established state data and messages flow between the connected objects. In a preferred embodiment, the connection is multiplexed so that data flows between both objects substantially simultaneously. In addition, preferred embodiments will also be those wherein servers and clients can maintain multiple connections, especially multiple multiplexed connections, substantially simultaneously. It is also preferred that the interaction between server and client be self-contained, i.e., the sender is not required to wait for a reply from the receiver. Preferred embodiments will also be those wherein a server/client can communicate in either role substantially simultaneously. Methods for implementing the above-described preferred communications are known to those having skill in the art.

Once the exchange of data has been completed and the connection record is to be returned to the free state, the connection record is moved to a closing state 508, which closing state is counterpart of opening state 504. Although closing state 508 is shown as a single node of the state diagram, it will be appreciated that this state in fact comprises a number of substrates as will be described in more detail below. In the closing state, the connection record is still unavailable for use by other objects pending the time lag associated with processing the closing of the connection across the network. Once the connection has been closed the connection record is moved to the free state where it is available for use by other objects as described above.

In a preferred embodiment, closing state 508 comprises several substrates (not shown), reflecting the conditions under which the connection is being closed. As described below, each party to a connection must have a connection record for that connection. When the party that is terminating the connection, e.g., the client, sends a connection end message (described below), the state of the connection record is set to "Close_Sent". When the other party of the connection, e.g., the server, receives the connection end message, the connection state of that connection record is set to "Close_Received". In addition, where both parties to a connection shut down that connection at subsantially the same time, the connection record of the each party is changed from "Close_Sent" to "Close_Received" when a connection end message is received from the other party. It will be appreciated that such as process provides a symmetric handling of the connection end message. The connection is then closed using a reliable three-way disconnect handshake (such as used, for example, in TCP), which will be familiar to those of skill in the art.

In a preferred embodiment, the present invention includes a method for establishing connections between a connection initiator, which includes any entity capable of initiating communications with another entity of the distributed object system, and a connection acceptor, which includes any entity capable of responding to a connection initiator. For convenience, the connection initiator will be referred to herein as a "client" and the connection acceptor will be referred to herein as a "server". Preferably, the established connection between the client and server is symmetric.

A preferred method for establishing connections between clients and servers is illustrated in FIG. 6 at 600. For simplicity, the method will be described with respect to a client. However, both client and server will perform the steps described below to establish both ends of the connection. Beginning at step 602, a client seeking to establish a connection to a server first acquires a table lock on a table of active connection records at step 604 to prevent other objects or threads from accessing the table while the client searches for an active connection record as described below. After acquiring the table lock, the client searches the table for an active connection record, i.e., a connection record identifying an existing connection between a client and the desired server process, at step 606. At step 608, a determination is made as to whether an active connection record for a connection to the desired server can be found.

If an active connection record to the desired server is available, the state of the connection is determined at step 610. An active connection record can indicate that the connection is opening, established or closing as described above with respect to FIG. 5. If the active connection record is in the established state, then at step 612 the record is checked to determine if the write lock of the connection is held. If the write lock is not held, the record is available for use and, at step 614, the write lock is acquired by the client. The table lock is then released at step 616 and the sequence terminates at step 618. The client now has a connection to the target object. The use of table locks, write locks and wait states will be familiar to those of skill in multithreaded programming.

If the write lock is held, or if the connection state of the record is opening, the table lock is released at step 620 and the client goes into a wait state at step 622 until signaled by another thread trying to establish a connection to the same server process to check the table of active connection records. It will be appreciated that providing a wait state allows more efficient utilization of resources since a server can become overloaded with requests if all clients are allowed to establish connections to that server at the same time. As will be familiar to those of skill in the art, wait state 622 includes checking a condition variable for an indication that the waiting thread is to become active. When the thread wakes, it is granted the table lock while other waiting threads continue to wait. It will be appreciated that wait states could be timed such that a waiting thread will maintain its wait state for a predetermined period before either establishing a connection (step 624) or terminating the process of establishing a connection (and possibly returning an exception or error).

If the connection state is determined to be closing, or if no active record is available, the client then must create a connection at step 624. This step is described in greater detail in FIG. 8 below. The table lock is then released and the sequence terminates as described above with respect to steps 616 and 618.

Figure 7A:
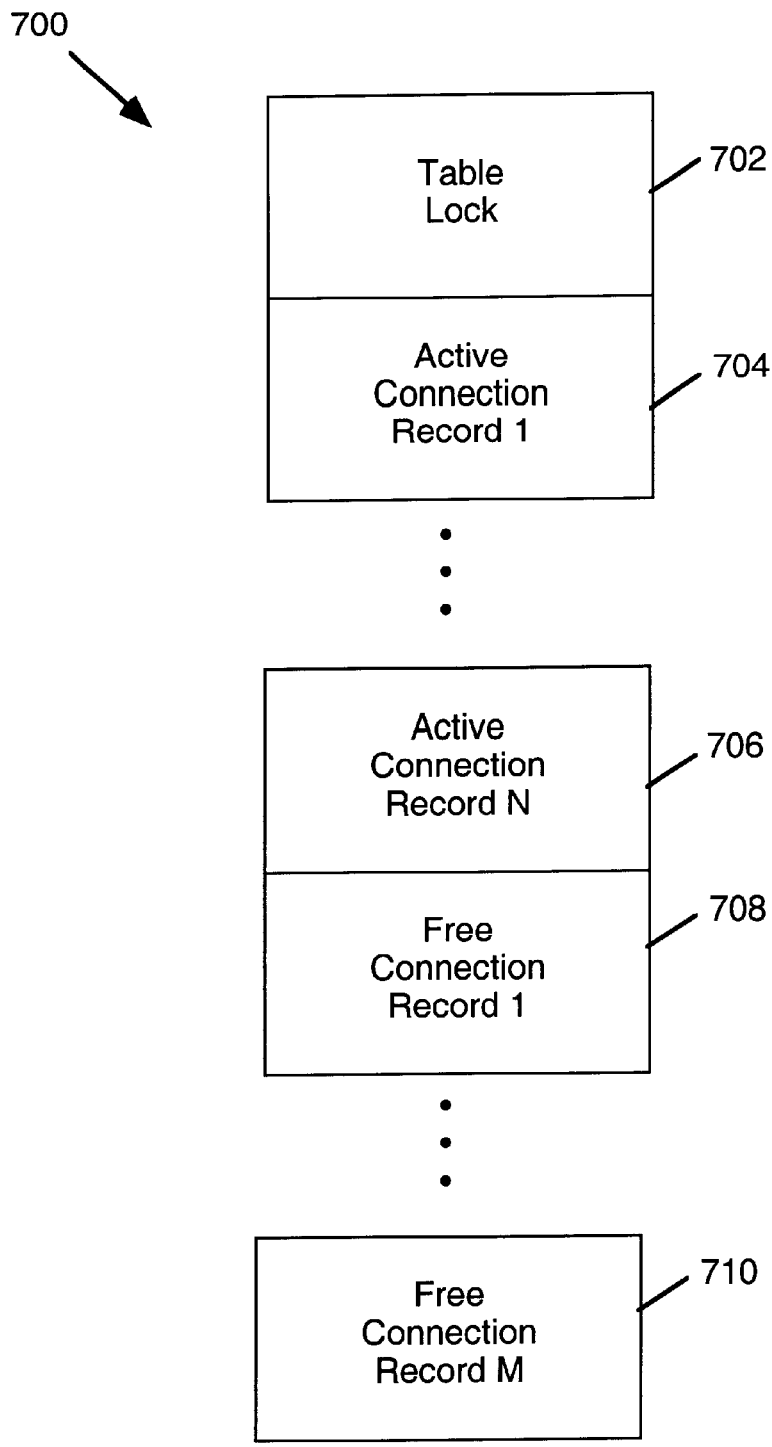
FIG. 7a is a schematic illustration of a table of connection records in accordance with one embodiment of the present invention.

Each process has a table of connection records that is located preferably in the process heap storage, although the table can be a pre-allocated table in memory. In a preferred embodiment, the table has the structure shown in FIG. 7A at 700. The table includes a Table Lock 702 and a series of active connection records staring with a first active connection record (Active Connection Record 1 704) and terminating with the $N^{th}$ active connection record (Active Connection Record N 706). The table can also include free connection records which are appended to the active connection records, such as Free Connection Record 1 708 through Free Connection Record M 710. These free connection records will be discussed below. M and N can be the same, or different, numbers, i.e., the numbers of active connection records may or may not be equal. Although the records are illustrated as being a contiguous block of active and free connection records, it will be appreciated that the records may be found in the table in no particular order or that the active and free connection records may be store in separate tables.

Figure 7B:
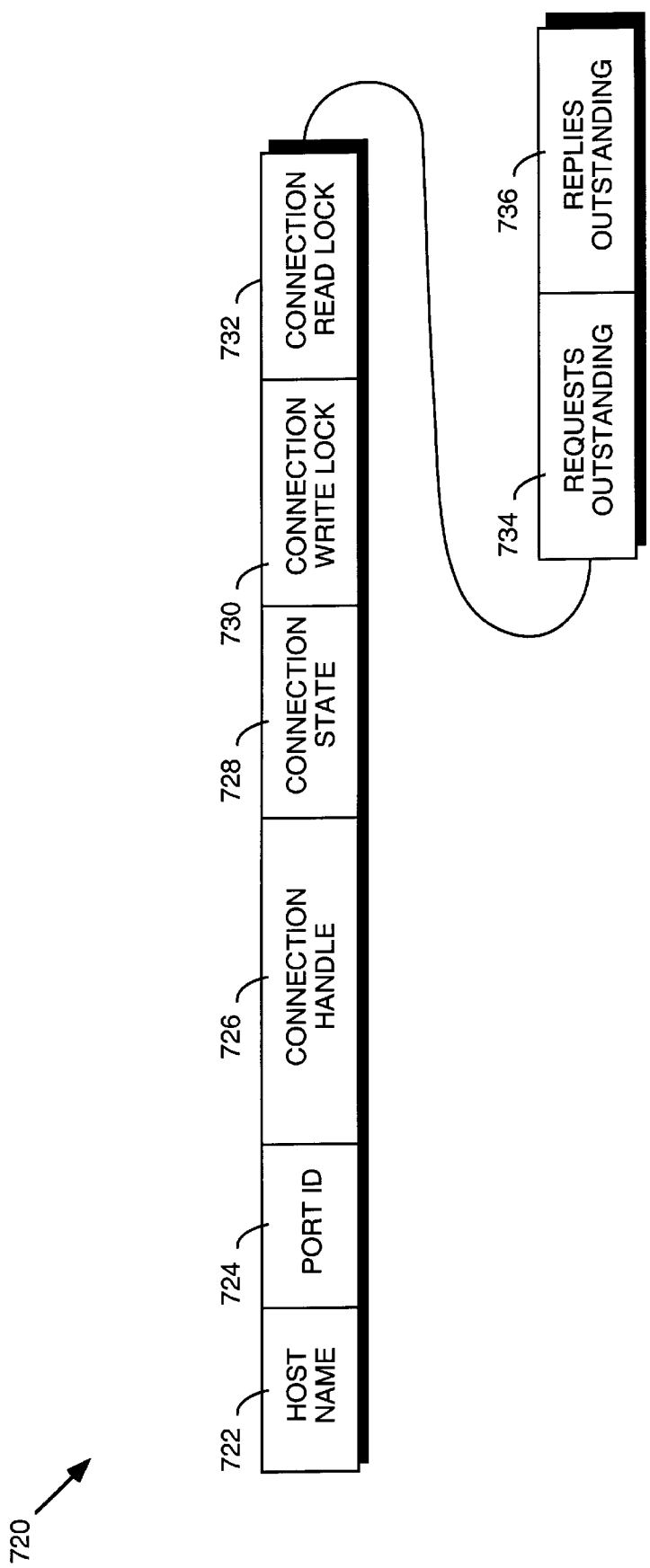
FIG. 7b is a schematic illustration of an active connection record data structure in accordance with the present invention.

The structure of a connection record (active or free) in a preferred embodiment is illustrated in FIG. 7B at 720. A connection record includes a Host Name 722 that identifies the machine on which the server process (or client) is located, a Port ID 724 that identifies the port number of the host machine and a connection handle 726 that identifies the connection itself. Host Name 722 and Port ID 724 are supplied by the ORB as described above with respect to FIG. 4. Once the host name and port have been identified, the connection handle is obtained using the methods described in co-pending U.S. Patent Application Serial No. (Attorney Docket SUN1P025/P721) entitled "METHODS, APPARATUS, AND DATA STRUCTURES FOR MANAGING OBJECTS", by David Brownell, et. el.

In addition, the connection record includes the Connection State 728, which may be free, opening, established or closing as described above. Connection Write Lock 730 indicates whether the connection is available for writing by a thread and Connection Read Lock 732 indicates whether the connection is available for reading by a thread. Requests Outstanding 734 and Replies Outstanding 736 are counters to indicate whether the client has issued a request that has not been responded to or whether the server has received a request that it has not replied to. These last two pieces of information thus provide a means of determining whether communication between a client and server has been completed cleanly, i.e., whether the request sent to the server by the client have been responded to.

Thus, referring back to FIG. 6, a connection record is considered to be found if the Host Name and Port ID of the connection record are those of the desired server to which a connection is to be established. The state of the record is determined by examining the Connection State of the record. If the correct Host Name and Port ID are found, but the write lock is held by another thread, access to the connection by other threads in the process is denied. This condition is analogous to receiving a "busy signal" on a telephone line. Thus a connection can be accessed only if the correct Host Name and Port ID are found, the connection is in the established state and the write lock is not held. If a connection record in such as state is found, the write lock and read lock of the record are updated so that the write lock and the read lock are indicated as being held. The connection is then formed between the client and server.

Figure 8:
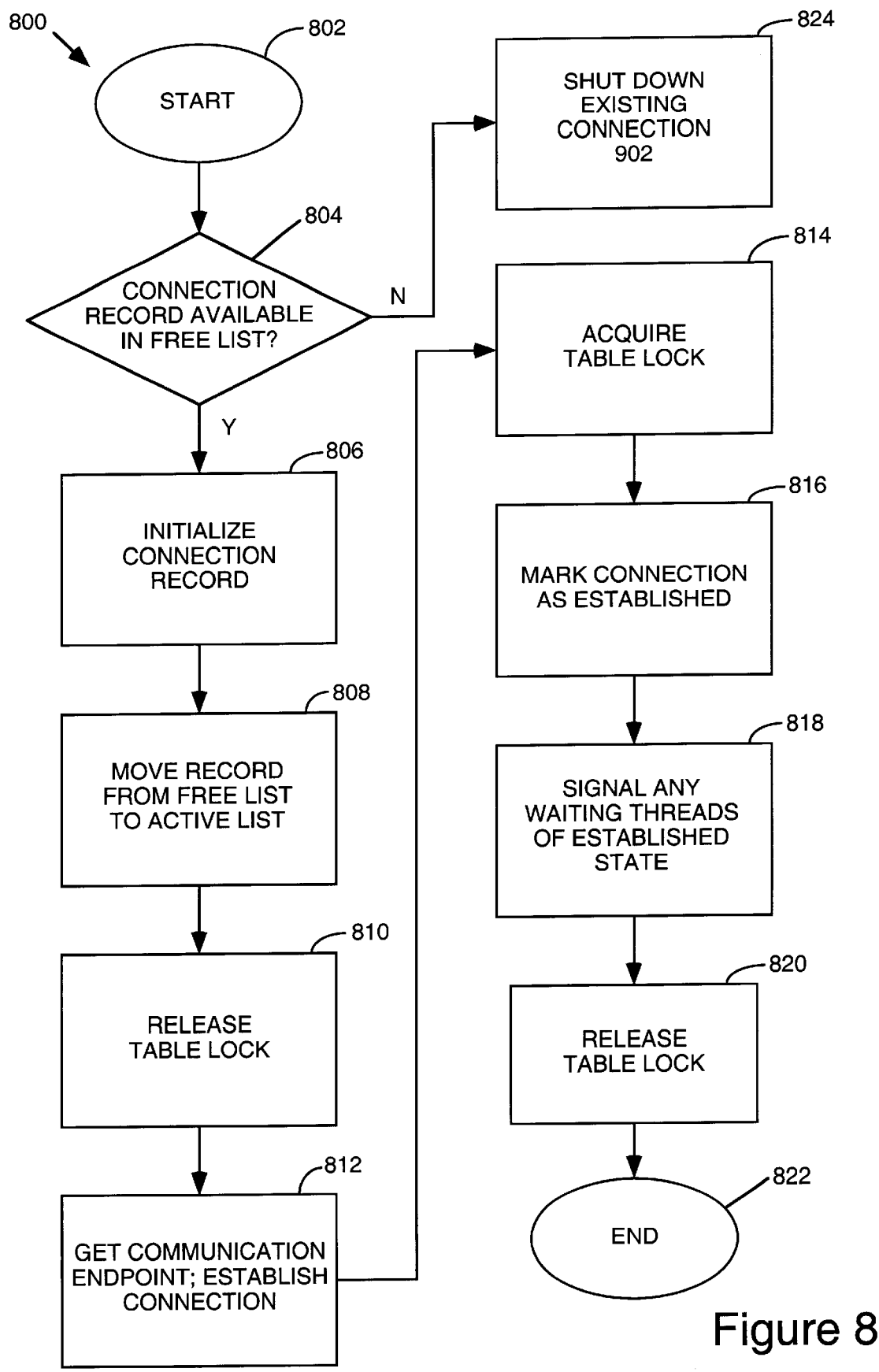
FIG. 8 is a schematic illustration of a method for establishing a connection between a client and a server in accordance with the present invention.

If the connection state is closing or no active connection record is available, then a new connection must be created as described in detail at 800 in FIG. 8. Beginning at step 802, a determination is made as to whether a free connection record is available at step 804. Free connection records are connection records that are not in use. If a free connection record is found, the record is initialized at step 806 by setting the appropriate Host Name and Port ID for the server, setting the Connection State to "opening", getting the write and read locks and zeroing the Outstanding Request and Outstanding Replies counters.

At step 808, the record is moved from the free connection record list to the active connection record list. At step 810 the table lock is released, and, at step 812, the communication endpoint is obtained and the connection is established. Preferably, a packet of information is sent to other side of the connection to aid in troubleshooting and debugging as will be familiar to those of skill in the art. The table lock is reacquired at step 814, and, at step 816, the Connection State of the connection record is set to indicate that the connection is "established". At step 818 any waiting threads are signaled that the state of the connection record has been updated to "established". At step 820 the table lock is again released; however, the write lock remains held so that other threads may access the table of connection records, but access to the particular connection record is blocked as described above. The procedure terminates at step 822.

Figure 9:
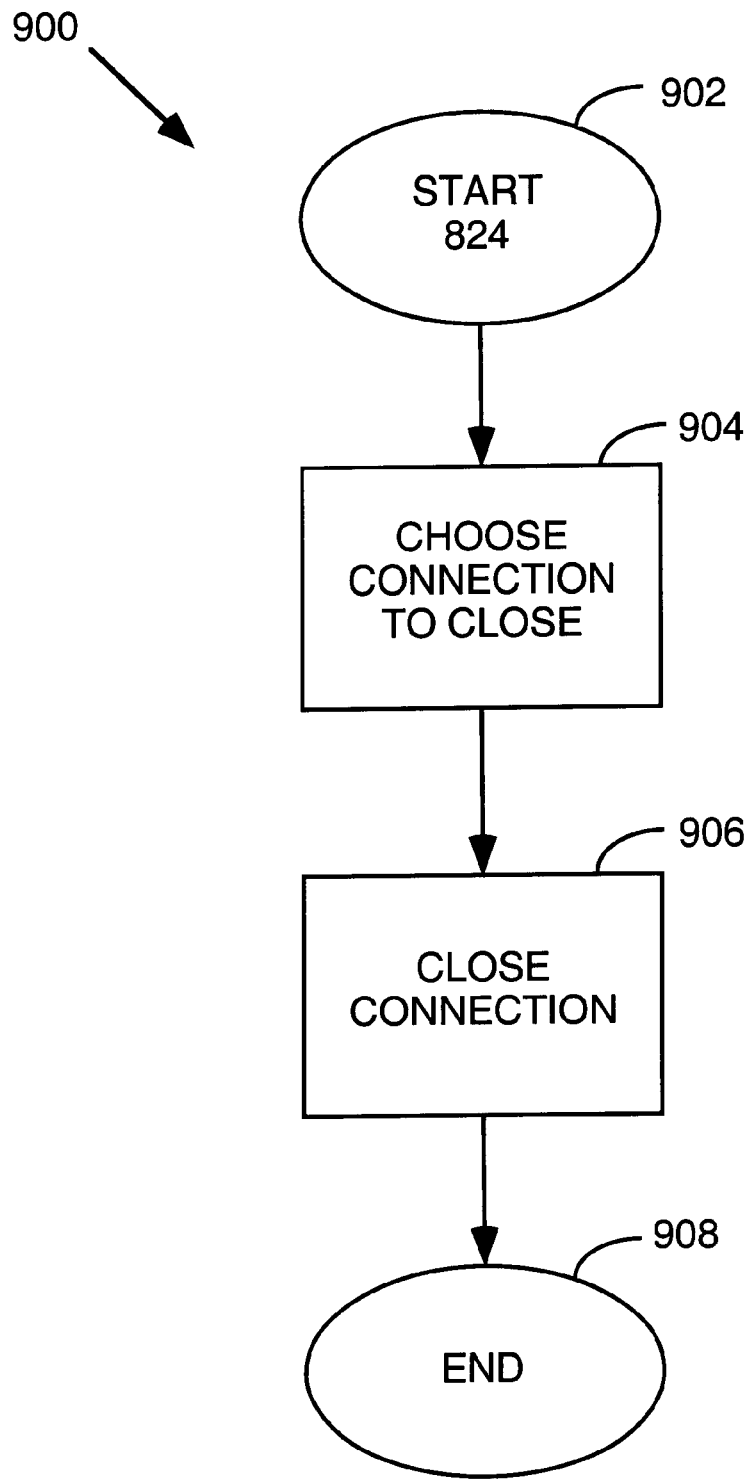
FIG. 9 is a schematic illustration of a method for closing a connection in accordance with the present invention.

Referring back to step 804, if a free connection record is not available, then, at step 824, an attempt is made to shut down an existing connection so that a new connection record is free to be reused to establish a new connection. A method for shutting down existing connections is described generally at 900 in FIG. 9. Starting at 902, a connection record of a connection to be closed is first chosen at step 904 and that chosen connection is then closed at step 906. The procedure terminates at step 908.

In a preferred embodiment, the choice of a connection to close is made using the following considerations. Only a connection that is in the established state can be closed. Connections that either are in the opening state or the closing state cannot be pre-empted. A connection to be closed cannot be one in which a client is waiting for a reply to an earlier made request (i.e., the value held in Requests Outstanding register 734 is non-zero); nor can the connection have a object which has received a request but has not yet forwarded a reply to the requesting client (i.e., the value held in Replies Outstanding register 736 is non-zero). If two or more connection records meet these criteria, then the oldest unused connection (i.e., the most stale connection) will be chosen for termination. In one preferred embodiment, the connection records are closed in groups, even if only a single new connection is sought to be made. This strategy ensures that a group of free connections is available for use. Alternatively, a single connection record may be phased out as needed. Such a strategy promotes efficiency by executing the steps of closing a connection only as required.

In another preferred embodiment, connection records are closed, either singly or in groups, when a threshold limit of connections to a given server has been reached. As noted above, in a preferred embodiment the present invention includes the ability to multiplex connections to an individual client or server. However, a server may become oversubscribed to clients, i.e., the server is receiving more requests then it can handle efficiently. Alternatively, a client may not want to wait more than a limited period of time to establish a connection to a server. Thus, it is preferable when a new connection is to be established that as many existing established, but unused, connections be terminated so as to free up server capacity. In addition, it is preferable to initiate the process of freeing established but unused connections before the server or client object reaches limits that degrade the performance of the system. Thus, when it appears that the number of connections made to an individual server or client has exceeded a predetermined threshold, in a preferred embodiment, the above described termination of connections is initiated. In a preferred embodiment, the threshold is reached when an operating limit of the system is reached (e.g., the maximum number of connections is in use). However, a lower threshold can be defined, for example, as a percentage of the maximum number of connections.

In a preferred embodiment, either the client or the server can choose to terminate a connection. Thus, three scenarios for the termination of a connection are possible: (1) the client terminates the connection; (2) the server terminates the connection; or (3) the connection is terminated due to the occurrence of an error within the system, e.g., the physical connection between the machines on which the client or the server are running fails. Thus, it will be appreciated that of the three possible conditions under which a connection can be terminated only one is a true error state. The other two conditions are the result of deliberate actions.

Figure 10:
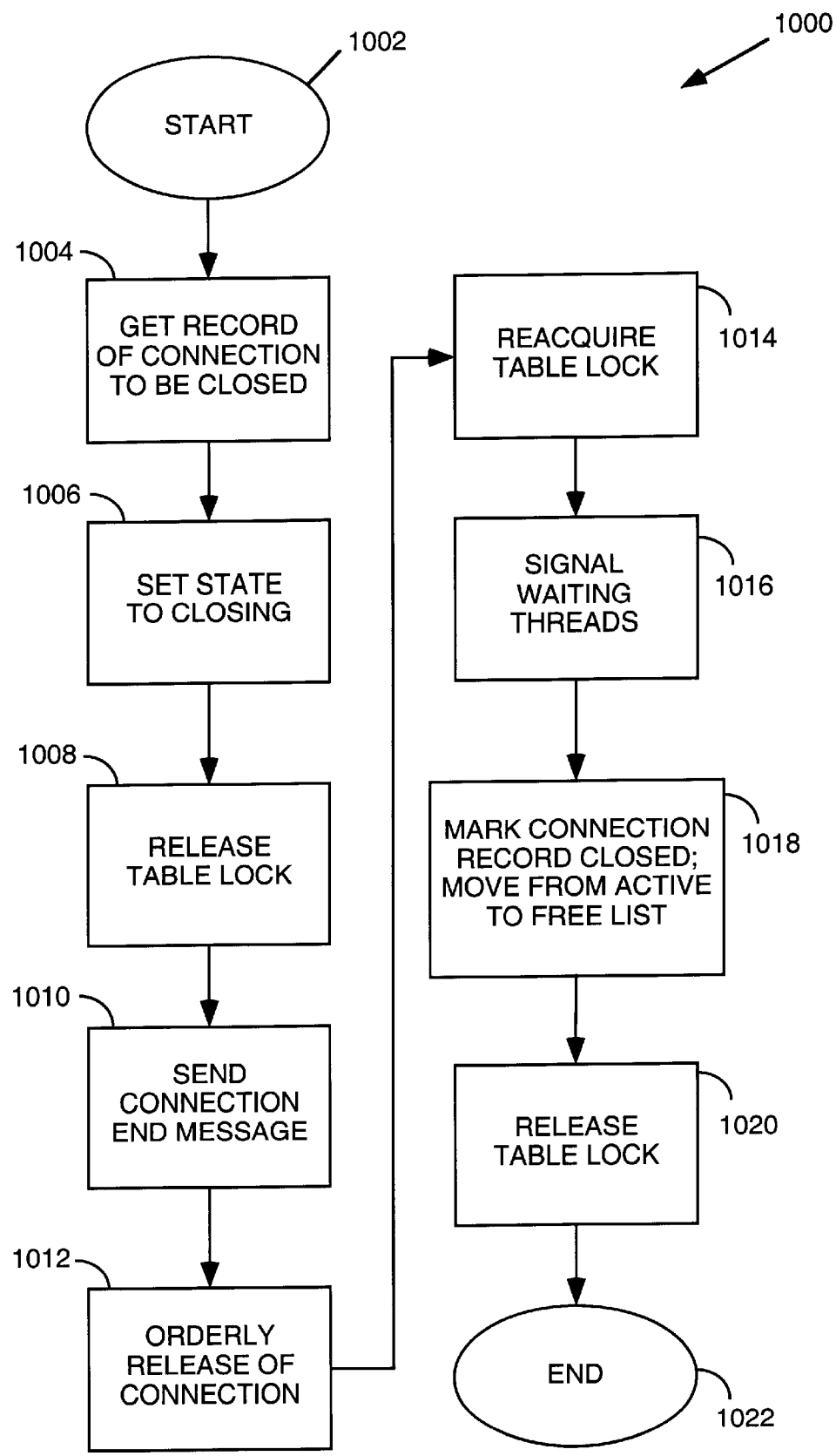
FIG. 10 is a schematic illustration of step 904 described in FIG. 9.

The steps of terminating a connection are illustrated at 1000 is FIG. 10. Beginning at step 1002, step 904 of FIG. 9, the record of the connection to be closed is obtained at step 1004. At step 1006 the state of the record is set to closing and, at step 1008, the table lock is released so that other processes or threads may have access to the table of connection records. A connection end message is then sent to the other side of the connection at step 1010. In a preferred embodiment, the connection end message includes a shut down code as described below.

Once the connection end message, including an appropriate shut down code, if any, is sent, the orderly release of the connection, using standard methods, is performed at step 1012. The table lock is then reacquired at step 1014 and, at step 1016, any waiting threads are signaled as described above with respect to step 622 of FIG. 6. At step 1018 the connection record is marked as closed and moved from the list of active connection records to free connection records. The table lock is released at step 1020 and the procedure terminates at step 1022.

In a preferred embodiment, the connection end message further includes a connection shut down code that is either a reconnect or a rebind code. Generally, a client or server will send a reconnect code when the client or server needs to reclaim connection resources, such as for example, if a connection to a server cannot be established, a server is oversubscribed or an existing connection has not been used for a relatively long period of time (i.e., the connection is "stale"). In the case of a reconnect code, if the other party wants to re-establish the connection to the connection, that party follows the procedure starting at step 624 of FIG. 6.

If the server initiates the connection shut down as part of a server process shut down, e.g., because the system has decided to free resources by shutting down a server process, a rebind code is sent with the connection end message. Under this condition, the server follows the steps described in FIG. 10 for each connection in the connection table to be closed. As noted above, this may be every connection to the server, one connection or selected connections. If the client seeks to re-establish communication with the server, the client sends a locator look-up call to the ORB as described above to start a new server process and re-establish a connection to the target object.

Figure 11:
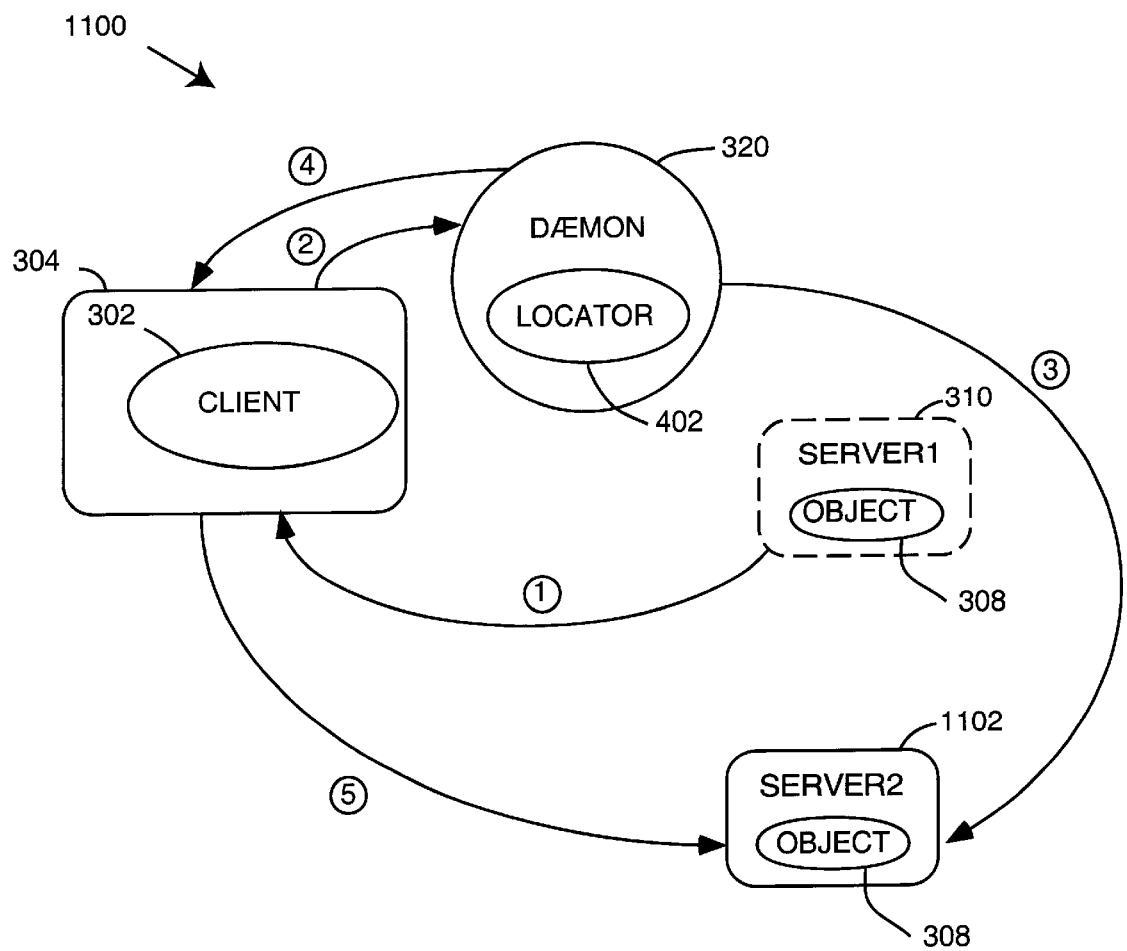
FIG. 11 is a schematic illustration of the use of a shut down code in the closing of a connection between a client and a server.

The sequence of events during a server-initiated server process shut down is illustrated in FIG. 11 at 1100, which illustrates the server-initiated termination of a connection between client 302 in process 304 and server 310 (SERVER1) of FIG. 4. Upon receipt of a connection end message including the above-described rebind code from server 310 along pathway 1, client 302, if it desires to continue communication with object 308, sends an appropriate locator look-up message to Demon 320 (pathway 2). Demon 320 uses Locator 402 to spawn a second server, server 1102 (SERVER2) containing a new incarnation of object 308 (pathway 3) using the methods described in co-pending U.S. Patent Application Serial No. (Attorney Docket No. SUN1P030/P747 entitled "METHODS AND APPARATUS FOR MANAGING COMPUTER PROCESSES", by Peter Vanderbilt, et al. Having spawned the new server process which contains the original object 308, the address of the new location is passed to client 302

(pathway 4) which then uses the methods described above to initiate a new connection, this time to server 1102 through which client 302 can access object 308 (pathway 5). The above described method takes advantage of the fact that objects typically reside in persistent storage after processes with which they are associated have been deleted by the system. In this manner, a client can regain the use of an object in an efficient manner, as the connection end message provides the means through which the client can retain use of the object by sending the appropriate locator look-up message to the Dœmon. It will be appreciated that locator look-up messages and their processing are well known to those of skill in the art.

Thus, when a connection is closed, the entity shutting down the connection informs the other end of the connection through the connection end message that it has detected no further use of the existing connection. After receiving such a message, the object at the other end of the connection then will assume that the sender of the connection end message will no longer accept new requests and, more importantly, that any messages sent prior to the connection end message for which no reply has been received will not be handled by that server. If the client wants to reconnect to the server process, the client can use the above described locator look-up call to the Dœmon to to start a second server and rebind to a new server process by establishing a connection to the new object as described above. The client does not receive an error message in the case of a deliberate termination of a connection with a server or deliberate shut down of the server. Thus, the present invention handles the problem of gracefully terminating connections and servers in a distributed object without reporting false errors.

From the foregoing, it will be appreciated that the above described method and apparatus provides a means for managing efficiently connections among objects and distributed object systems. Using the method and apparatus of the invention connections may be formed and terminated among objects in a highly efficient manner which includes the use of multiplexed connections between processes, and intelligent termination of connections that allows terminated clients to reinitiate contact with the objects for which access they seek.

Although the present invention has been described with reference to specific embodiments and examples, it will be appreciated by those having skill in the art that various changes can be made to those embodiments and examples without the departing from the scope or spirit of the invention.

TABLE OF REFERENCES

The following materials are incorporated herein by reference for all purposes.

Interface User's Guide and Reference: *Project DOE External Developer's Release* 2. 1994. SunSoft.

Gibbs, W. W. 1994. Trends in Computing: Software's Chronic Crisis. *Scientific American* 271(3): 86–95.

Levy, H. M., and Tempero, E. D. 1991. Modules, Objects and Distributed Programming: Issues in RPC and Remote Object Invocation. *Software—Practice and Experience* 21(1): 77–90.

Object Management Group (OMG). 1993. The Common Object Request Broker: Architecture and Specification. OMG Document Number 93.12.43, Revision 1.2, Draft 29.

Solely, R. Ed. 1990. *Object Management Architecture Guide* (Revision 1.0). OMG Document 90.9.1.

Rao, B. R. 1993. $C^{++}$ and the *OOP Paradigm*. McGraw-Hill.

Taylor, D. 1990. Object Oriented Technology: *A Manager's Guide*. Addison Wesley.

What is claimed:

1. In a distributed object system in which a sever associated with a server process for use in a computer system communicates with a client across a computer connection between the server process and the client, a computer implemented method for deliberately terminating the connection between the server process and the client, the method comprising the computer controlled steps of:
    a) establishing a multiplexed connection between said server process and said client, wherein the multiplexed connection is arranged to enable said server associated with said server process and said client to pass data between each other using a single physical connection;
    b) passing messages between said server process and said client across said multiplexed connection;
    c) sending a connection end message from said server to said client across said multiplexed connection, said connection end message being effective to indicate to said client that said server will no longer respond to request messages from said client, wherein said connection end message includes one of a reconnect code or a rebind code;
    d) checking a replies outstanding register to determine whether said server has received a request that it has not replied to and checking a requests outstanding register to determine where said client has issued a request that has not been responded to;
    e) storing information regarding said multiplexed connection between said server and said client thereby enabling re-establishment of a second multiplexed connection; and
    f) closing said multiplexed connection if the requests outstanding register and the replies outstanding register have zero values, thereby ensuring that said multiplexed connection is closed cleanly.

2. The method of claim 1, wherein said server process maintains a multiplexed connection with at least a second client in addition to said client.

3. The method of claim 1, further including the computer controlled step of determining that said client is not waiting for an outstanding reply from said server.

4. The method of claim 3, further including the computer controlled step of sending a connection shut down message to said client.

5. The method of claim 4, further including the computer controlled step of sending a request from said client to an object request broker to restart said server.

6. The method of claim 5, wherein said step of sending said connection end message is performed in response to a determination that said server process is overloaded.

7. The method of claim 6, wherein said determination includes the step of determining that the number of connections made to said server process exceeds a threshold value.

8. The method of claim 7, wherein said connections are listed in a data structure including a list of active connection records.

9. The method of claim 1, wherein said server is a server object resident in said server process.

10. The method of claim 1, wherein said client is a client process executing on a remote computer system.

11. The method of claim 1, wherein said client is a client object resident in a client process executing on a remote computer system.

12. In a distributed object system in which a server object associated with a server process communicates with a client across a multiplexed connection between the server process and the client, a system for deliberately terminating the connection between the server object and the client, the system comprising:
   a) a first mechanism for opening a multiplexed connection between said server process and said client, therein said multiplexed connection is arranged to enable said server associated with said server process and said client to pass data using a single physical connection;
   b) a messaging device operable for sending a connection end message from said server object to said client across said multiplexed connection, said connection end message being effective to indicate to said client that said server object will no longer respond to request messages from said client, wherein said connection end message includes one of a reconnect code or a rebind code;
   c) a storage device for storing information regarding said multiplexed connection between said server and said client, thereby enabling re-establishment of a second multiplexed connection;
   d) a register checker for checking a replies outstanding register to determine whether said server has received a request that it has not replied to and checking a requests outstanding register to determine whether said client has issued a request that has not been responded to;
   e) a second mechanism for closing said multiplexed connection if the requests outstanding resister and the replies outstanding register have zero values, thereby ensuring that said multiplexed connection is closed cleanly.

13. The system of claim 12, wherein said server process maintains a connection with at least a second client in addition to said client.

14. The system of claim 12, further including a first device operable for sending a connection end code with a connection end message.

15. The system of claim 13, further including a restart device operable for sending a request from said client to an object request broker to restart said server process.

16. The system of claim 12, wherein said messaging device is arranged to activate in response to a determination that said server process is overloaded.

17. The system of claim 16, wherein said determination includes determining that the number of connections made to said server process exceeds a threshold value.

18. The system of claim 15, wherein said connections are listed in a data structure including a list of active connection records.

19. A computer system for use in a distributed object system, said computer system comprising:
   a) a central processing unit;
   b) a memory accessible by said central processing unit; and
   c) a server process as recited in claim 12.

20. A distributed object system comprising:
   a) a plurality of computers as recited in claim 18; and
   b) a computer network interconnecting said plurality of computers.

* * * * *